United States Patent
Paduch et al.

(10) Patent No.: US 10,845,182 B2
(45) Date of Patent: Nov. 24, 2020

(54) MODULAR MICRO OPTICS FOR OPTICAL PROBES

(71) Applicant: HEXAGON TECHNOLOGY CENTER GMBH, Heerbrugg (CH)

(72) Inventors: Alexandre Paduch, Winterthur (CH); Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 210 days.

(21) Appl. No.: 15/389,242

(22) Filed: Dec. 22, 2016

(65) Prior Publication Data

US 2017/0184395 A1    Jun. 29, 2017

(30) Foreign Application Priority Data

Dec. 23, 2015 (EP) .................................... 15202538

(51) Int. Cl.
*G01B 11/00* (2006.01)
*G02B 6/36* (2006.01)

(52) U.S. Cl.
CPC .......... *G01B 11/005* (2013.01); *G01B 11/007* (2013.01); *G02B 6/3624* (2013.01)

(58) Field of Classification Search
CPC .. G01B 11/0005; G02B 6/3624; G02B 6/381; G02B 6/3825; G02B 6/3817
See application file for complete search history.

(56) References Cited

U.S. PATENT DOCUMENTS

| 4,963,728 A | * | 10/1990 | Hof | G01B 11/007 250/227.11 |
| 5,319,442 A | | 6/1994 | Rosser | |
| 6,633,051 B1 | * | 10/2003 | Holloway | G01B 11/007 250/227.13 |
| 6,772,527 B1 | * | 8/2004 | Butter | G01B 11/007 33/503 |
| 9,664,887 B2 | * | 5/2017 | Engel | G01B 21/047 |
| 2004/0185706 A1 | * | 9/2004 | Price | B23Q 3/15546 439/488 |

(Continued)

FOREIGN PATENT DOCUMENTS

| CN | 102252639 A | 11/2011 |
| CN | 103026168 A | 4/2013 |
| EP | 2 356 401 B1 | 10/2012 |

OTHER PUBLICATIONS

"The introduction of CMM Stylus", Nanomatrology, cmm-nano.com/info/the-introduction-of-cmm-stylus-19150172.html, 1999.*
(Continued)

*Primary Examiner* — Rebecca C Bryant
(74) *Attorney, Agent, or Firm* — Maschoff Brennan

(57) ABSTRACT

Some embodiments of the invention include a probe body of an optical probe assembly. The probe assembly may be designed for measuring a surface of an object while being carried by a probe head of a coordinate measuring machine. The probe body comprising a coupling unit at a first end of the probe body designed for providing coupling of the probe body to the probe head of a coordinate measuring machine and a light guiding element for transmitting original source light supplied by the probe head from the coupling unit to a second end of the probe body.

21 Claims, 4 Drawing Sheets

(56) References Cited

U.S. PATENT DOCUMENTS

| | | | |
|---|---|---|---|
| 2009/0187373 A1* | 7/2009 | Atwell | B25J 9/1692 |
| | | | 702/152 |
| 2011/0229091 A1 | 9/2011 | Jensen et al. | |
| 2011/0258868 A1 | 10/2011 | Jordil et al. | |
| 2012/0055912 A1 | 3/2012 | Sheu | |
| 2013/0055832 A1 | 3/2013 | Brenner et al. | |
| 2015/0009484 A1 | 1/2015 | Sesko | |

OTHER PUBLICATIONS

European Search Report dated Jun. 16, 2016 as received in Application No. 15202538.3.

* cited by examiner

MODULAR MICRO OPTICS FOR OPTICAL PROBES

FIELD

The present invention generally pertains to an approach of modular design of a measuring probe for a coordinate measuring machine (CMM) in order to adapt probe properties regarding required measuring conditions.

BACKGROUND

It is common practice to inspect work pieces subsequent to production on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe or probing unit) carried by the probe head. Such probing unit can be designed as a tactile probe or an optical sensor providing measurements of surfaces e.g. based on the principle of triangulation or interferometry.

In a simple form of the machine a suitable transducer or linear encoder mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform the part during the measurement or damage it, as may be the case with a tactile probe.

However, the type of optical probe used for measuring a particular work piece has to be chosen in such a way that measuring properties of the probe fit to the shape or to topographic properties of the work piece. For instance, for measuring a borehole the probe may preferably comprise a prism or mirror to emit the measuring beam in a predefined angle, e.g. 90°, relative to an extension axis of the probe stylus.

For providing individually suitable probes fitting to respective measuring requirements frequent changing of the probe attached to the probe head of the CMM is typically necessary. Moreover, a number of specified probes for respective measuring requirements are to be available to guarantee precise measurement of different work pieces.

A coordinate measuring machine and a respective probe thus typically comprise an interface which allows to both mechanical and optical, in particular also electrical, coupling of the two components. By such interface the probe can comparatively quick and with low effort be attached to the probe head and carried and positioned by the probe head for measuring purpose. Such an optical-mechanical interface is for instance known from EP 2 356 401 B1.

As according to that approach the whole probe is to be exchanged when having deviating measuring requirements, the frequency of negative mechanical influences at the probe as well as at the CMM is quite high due to typical measuring conditions e.g. in industrial processes. Therefore, over-all lifetime of such probes and interfaces is quite limited.

In addition, costs of high precise optical measuring probes are a high relevant factor with respect to total operating costs of a CMM, which means high total costs for providing different probes for different measuring requirements.

In that context a further disadvantage is related to initial minor damages to such a probe, e.g. damage at the emitting optics, which in the end results in comparatively high repair-costs or exchanging the entire probe by a new one for guarantee precise measurements.

SUMMARY

Some embodiments of the present invention provide an improved probing system for a CMM which allows fast and easy adaptation of the measuring conditions to demanded measuring requirements.

Some embodiments of the present invention provide a flexible CMM and probe design with respect to different work pieces to be measured.

Some embodiments of the present invention provide an adaptable measuring sensor, wherein an adaptation due to changing measuring conditions can be performed easy and the entire system is of comparative low complexity and costs.

Some embodiments of the invention relate to an approach of modularly setting up an optical probe assembly for measuring coordinates with a coordinate measuring machine. Instead of exchanging the whole optical measuring probe for respective non-contact measuring requirements, a specific basic probe body is mounted to the CMM and optical components for final definition of emitted measuring light are modularly mountable at the other end of the probe body and exchanged according to measurements to be conducted.

Some embodiments of the invention relate to a probe body of an optical probe assembly, the probe assembly being designed for measuring a distance to an object, e.g. to measuring points at the object, while being carried by a probe head of a coordinate measuring machine. The probe body comprises a coupling unit at a first end of the probe body designed for providing coupling of the probe body to the probe head of a coordinate measuring machine. Thus, the probe body can be positioned and oriented within limits of degrees of freedom provided by the CMM. In particular, the probe body itself comprises means for relative rotation of parts of the probe body and provides kind of an articulated probe body.

The probe body may further comprise a light guiding element for transmitting original source (undefined measuring) light supplied by the probe head from the coupling unit to a second end of the probe body.

In some embodiments of the invention, the term "original source" or "undefined measuring light" is to be understood as a specification of light provided by the CMM and transmitted via the probe body but not yet suitable for conducting coordinate measurements with the CMM. Original source light here means light which may be defined in a particular way, but demanded or desired light properties for measurement are not fulfilled. For instance, wavelength, polarisation and/or intensity of such light may be well known and well defined but a resulting spot size and/or collimation necessary for respective distance measurements are not defined. Therefore, original source light stands for light which may be defined in part but final measuring requirements are not provided. Moreover, original source light not necessarily corresponds to light initially generated on side of a light source (e.g. laser diode) of the CMM and not further being modified, but may be light which is already manipulated in any way and is emitted from the CMM after such manipulation.

According to some embodiments of the invention a micro-optics interface is provided at the second end of the probe body, the interface comprises a light emitting element providing emission of the original source light in defined direction relative to the second end and with basically an emitting divergence defined by the light guiding element and/or defined by the light emitting element. Moreover, the micro-optics interface comprises a mechanical probe-coupling (receiving coupling element) designed for receiving a coupling counterpart being provided by a mechanical component-coupling (attaching coupling element) of a beam-defining optical component of the optical probe assembly. The original source light is providable by the probe body with basically the emitting divergence and desired measuring light with desired measuring light property (characteristic) for measurement is providable by coupling (mounting) of the beam-defining optical component to the probe body.

Such a desired measuring light property can be a defined angle of emission of the measuring light (e.g. relative to an extension axis of the probe body), a particular beam shape, a collimation or focussing of the measuring light or a point (location) of emission of the light relative to the probe head or coupling unit (e.g. a defined distance defined by a stylus).

According to some embodiments of the probe body of the invention, the light guiding element is represented by an optical fibre or free-beam optics. Thus, light supplied or received by the CMM can be guided via the free-beam optics, e.g. an arrangement or lenses, of the optical fibre through the probe body, in particular in two directions (bidirectional). Alternatively or additionally, the light guiding element comprises a lens, in particular a collimation lens.

The light emitting element can, for example, be represented by a ferrule, wherein the ferrule provides emission of the undefined measuring light with a divergence corresponding to the divergence defined by the optical fibre. Here, the optical fibre can be received by the ferrule which may provide suitable fixing at the second end or interface of the probe body. Alternatively or additionally, the light emitting element comprises a lens, in particular a collimation lens.

In particular, for example, the mechanical probe-coupling comprises at least one sphere of a ball-bearing, in particular three spheres, or at least one sphere-counterpart of a ball-bearing. The interface thus provides a (one side) part of a typical ball-bearing and a respective ball-bearing would be completed when attaching the second (counter-) part (which may be provided on side of a beam-defining optical component to be attached to the probe body).

According to a further embodiment of the invention, the mechanical probe-coupling of the probe body comprises at least one magnetic element, in particular a switchable electro-magnetic element, for generating a holding force on demand for connecting (coupling) the beam-defining optical component.

Such controllable magnetic elements (in particular together with above ball-bearing parts) provide fully automated coupling and uncoupling of respective beam-defining optical components which results in the possibility of a fully automated measuring process, wherein the CMM controls movement of the probe body relative to provided beam-defining optical components and coupling of respective components is initiated by controlled activation of the electro-magnets. The components to be coupled can be predefined by a part program for a particular work piece to be measured. The components may be provided by a respective tool changer.

In a further embodiment the probe body comprises a stylus, wherein the free end of the stylus corresponds to the second end of the probe body. The interface is situated at the free end of the stylus. Such stylus enables for more flexible measurements e.g. regarding defines measuring points hard to approach.

Some embodiments of the invention relate to the modularly mountable counterpart to the probe body which provides for defining the measuring light so that a particular light property suits to demanded measuring criteria.

Such beam-defining optical component of an optical probe assembly—the probe assembly being designed for measuring a surface of an object while being carried by a probe head of a coordinate measuring machine—comprises a micro-optics component-interface having a mechanical component-coupling designed for coupling the optical component to a counterpart provided by a mechanical probe-coupling at a second end of a probe body of the optical probe assembly. Moreover, the beam-defining optical component comprises a light manipulating optical element designed for providing desired measuring light with desired measuring light condition based on manipulation of original source light provided (transmitted) by the probe body.

The beam-defining optical component and its component-interface are designed, for example, to be connectable with a counter-interface (micro-optics probe-interface) on side of the probe body. Those two units are designed according to a plug/socket principle, i.e. the optical component interface is designed to structurally fit to a design of the probe body interface and vice versa.

The light manipulating optical element of the optical component can be built, for example, as one or as a combination of the following optical elements:
    at least one lens,
    a prism,
    a mirror,
    a light guiding element, in particular free beam optics or an optical fibre, and/or
    an actuator, in particular a piezo element or a micro-electro-mechanical system (MEMS), wherein the actuator comprises a reflecting member.

Providing one or more of those optical elements enables to individually and/or suitably manipulate the light being delivered by the probe body in at least partly undefined manner.

The optical component can be designed as a stylus or as an extension for a stylus of the probe body, in particular comprising an optical fibre. By such approach, the choice of mounting a stylus to the probe body is provided. Additionally, the length of such stylus can be adjusted according to given measurement requirements, e.g. by modularly adding a stylus of suitable length or mounting a further stylus component for elongating another attached stylus.

According to a further embodiment according to the invention the optical component comprises a data memory unit and a data interface which provide information about optical properties of the optical component, in particular information about properties of the light manipulating optical element or a probe-type, wherein the data memory is built as an EEPROM memory and/or the data interface comprises electronic contact means or wireless communication means. By doing so, the probe assembly and its components become a "smart" probe assembly automatically proving respective measuring properties and thus enabling monitoring of a measuring process with view to possible errors in setup.

The mechanical component coupling can comprise at least one magnetic element, in particular a switchable electro-magnetic element, for generating a holding force (in demand) for connecting the beam-defining optical component and/or can comprise at least one sphere of a ball-bearing, in particular three spheres, or at least one sphere-counterpart of a ball-bearing. As mentioned above such elements represent an one-sided part of respective interconnection elements, i.e. parts of a respective bearing and parts of the mechanical coupling, which in connection with counterparts on side of the probe body provide precise coupling of the optical component.

According to an embodiment of the invention, the optical component comprises a further micro-optics component-interface arranged at an opposite end of the optical component relative to the component-interface for coupling the optical component to the probe body, the further micro-optics component-interface is designed for receiving a coupling counterpart being provided by a further beam-defining optical component for the optical probe assembly. With such approach, a stack-like arrangement of several beam-defining optical components is available. Intermediate optical components here comprise at least two component-interfaces so that a connection of at least one other such optical component and/or to the probe body is possible.

In particular, the further beam-defining optical component can be designed, for example, according to an optical component as described above.

Some embodiments of the invention relate to the whole optical probe assembly in general, i.e. a coupled arrangement of the probe body and at least one beam-defining optical component. The optical probe assembly for a coordinate measuring machine is embodied as a system of a probe body as described herein above and below and a beam-defining optical component described herein above and below. The optical probe assembly is designed to be carried by a probe head of the coordinate measuring machine and to receive and emit measuring light of desired properties.

According to the invention the beam-defining optical component is coupled to the probe body by means of the micro-optics interfaces, in particular by means of the mechanical couplings, and the original source light is transmittable and adjustable by means of the optical probe assembly so that it is emittable as measuring light with desired measuring light properties defined by the beam-defining optical component.

The optical probe assembly thus provides emitting of well defined measuring light to an object to be measured and receiving measuring light reflected at the object's surface. Reflected and received light can be transmitted to a respective sensor or detector by means of the probe assembly.

According to an embodiment of the invention the optical probe assembly comprises electrical connection for data transmission from the beam-defining optical component through the probe body to the probe head, wherein information about an attached probe configuration according to a type of beam-defining optical component and a type of probe body is transmittable to the coordinate measuring machine.

According to an embodiment of the invention the optical probe assembly comprises a further beam-defining optical component, in particular as mentioned above, wherein the optical component coupled to the probe body is embodied according to an intermediate one of above and the further beam-defining optical component is coupled thereto.

BRIEF DESCRIPTION OF THE FIGURES

The method and the device according to the invention are described or explained in more detail below, purely by way of example, with reference to working examples shown schematically in the drawings. Specifically.

DETAILED DESCRIPTION

Figures 1A, 1B:
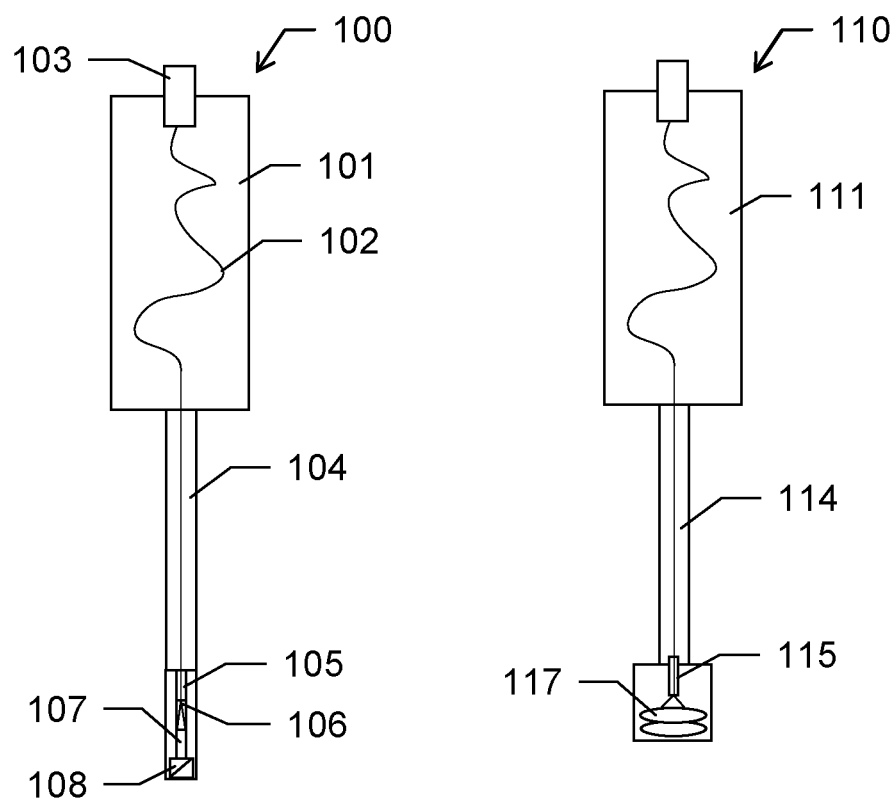
FIGS. 1a-b show optical probes being attachable to a probe head of a coordinate measuring machine for measuring coordinates as known from prior art.

FIGS. 1a and 1b show optical probes 100,110 being attachable to a probe head of a coordinate measuring machine for measuring coordinates at an object to be measured. Those types of optical probes 100,110 are well known.

The optical probe 100 comprises a probe body or probe basis 101 with an optical connector 103 providing transmission of measuring light from and to a probe head of the coordinate measuring machine. An optical fibre 102 is connected to the optical connector 103 for guiding measuring light through the probe 100. The probe 100 further comprises a stylus 104 attached to the probe body 101. The stylus 104 enables to provide emission of the measuring radiation in defined distance from the probe body 101 and by an optical element having comparatively small spatial dimensions. Thus, higher flexibility concerning measuring of objects of complex shapes and less inertias regarding movement of the probe 100, in particular regarding a rotation of the stylus in case of having an articulated probe (not shown), can be realised.

Additionally, the probe 100 comprises a specific ferrule 105, e.g. a 1 mm or 1.8 mm glass ferrule, mounted on the stylus 104 and receiving one end of the optical fibre 102. A spacer 106 (e.g. air or glass spacer) provides a defined distance between the ferrule 105 and a GRIN lens 107. In addition, shown here is a prism 108 for deflecting the measuring light with a defined angle (e.g.) 90°, wherein such deflecting unit 108 is an optional feature.

Such a probe can preferably be used for measuring surfaces within e.g. boreholes or other channels.

The probe 100 is manufactured in a way that the probe components are fixed relative to each other in well defined manner. Thus, precisely defined optical properties of the whole probe 100 are well known and provide particular measuring parameters. This means that each probe has its particular optical configurations which are defined by e.g. a spot size, a measurement range and an emitting beam direction.

A further known probe configuration is shown with FIG. 1b, wherein a probe 110 also comprising a probe body 111 and a stylus 114 of quite similar configuration is shown. The difference compared to probe 100 of FIG. 1a is the combination and setup of optical components at the end of the stylus 114.

Probe 110 also comprises a ferrule 115 but of commercial type (e.g. standard 1.25 mm ceramic ferrule), in particular additionally having 0° ferrule reflection as interferometer reference reflection. A free beam optics 117 provided by a combination of lenses is attached for shaping the measuring beam according to required measuring characteristics.

The probes 100,110 are of typical and well known types with each having defined optical properties defining suitability for particular measurements.

As mentioned, such probes have to be exchanged on side of the probe head in order to provide specific and most suitable measuring conditions for correspondingly specific work pieces. As a consequence, for operating a CMM with view to measuring different work pieces a respective operator today requires complete probes as shown consisting for instance of optics, stylus, probe body with crash protection and matching CMM interface. Such probes are for example known as "HP-O" probes of Hexagon.

The use of complete probes with one optical configuration has therefore disadvantages like:
  a large cost impact,
  reduction of measurement space of the CMM, because each probe requires a place in the relatively large tool-changer for probes,
  a connection cycle at the interface for a probe exchange, with a negative impact on lifetime and robustness for the opto-mechanical CMM interface, and/or
  less flexibility for the user, because he needs to order a complete new probe to get a different optical configuration.

Figure 2:
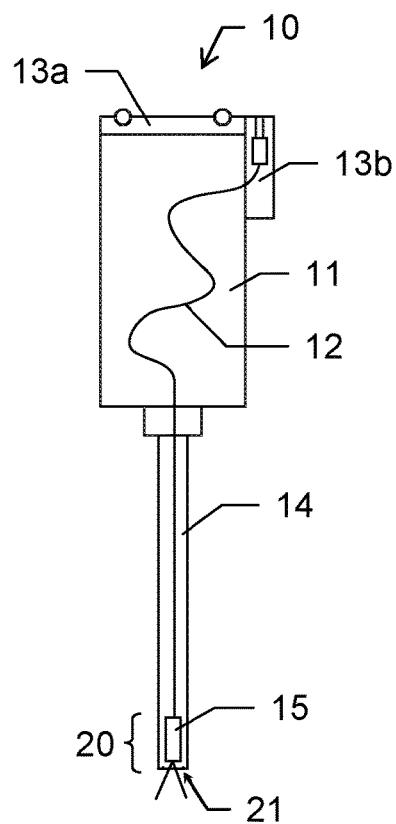
FIG. 2 shows an embodiment of a design of a probe body according to the invention.

FIG. 2 shows a different probe design according to the present invention. The probe 10 again comprises a probe body 11 (probe basis) with a stylus 14 (here to be understood as being part of the probe body 11).

As shown here, the probe 10 may also comprise an opto-mechanical interface for connection of the probe 10 or probe body 11 to a probe head of a coordinate measuring machine. The opto-mechanical interface has a mechanical part 13a for providing mechanical mounting to the probe head and an optical part 13b, e.g. with a floating ferrule, for providing suitable optical connection with the CMM. A possible design of such interface is e.g. described in EP 2 356 401 B1. Of course, it is to be understood that other mechanical and/or optical couplings known from prior art of coordinate measuring machines may be provided instead of such opto-mechanical interface.

An optical fibre 12 is connected with its first end to the optical part 13b of the probe interface and provides transport of measuring light from and to a probe head through the probe body 11 and the stylus 14.

The second end of the optical fibre 12 comprises a fibre ferrule 15. The optical fibre 12 particularly ends in the ferrule 15. From the fibre ferrule 15 the beam exits with a divergence of the fibre 12 itself (for standard fibres: e.g. NA≈0.1). The basic probe 10 may not comprise any further optical elements for providing a measuring beam with beam properties suitable for measurements. Consequently, the basic probe 10 would not be enabled to be used in its basic configuration for measurement purpose.

However, the probe 10 comprises a micro-optical interface 20 at the end of the stylus 14, wherein the ferrule 15 provides an optical coupling of measuring light (and is part of the micro-optics interface 20) and wherein mechanical coupling elements 21 are arranged for providing a corresponding mechanical coupling additionally.

To complete the probe for measuring purpose a modular micro-optic part has to be connected to the micro-optical interface 20. According to the invention, such micro-optic part is designed as a beam-defining optical component to receive light emitted from the fibre ferrule 15 and to form or manipulate (e.g. guiding) that light so that the light emits the beam-defining optical component particularly as defined measuring beam with defined light properties. The beam-defining optical component comprises an interface optically and mechanically corresponding with the micro-optics interface 20 of the probe 10.

According to a further embodiment of the invention, the stylus 14 is not part of the probe 10 but the micro-optical interface 20 is directly arranged at the probe body 11. A stylus-type component may then be modularly mounted at the probe body 11 using mentioned micro-optical interface 20, wherein the stylus-type component comprises one-sided part of such interface 20, in particular at its both ends. The modularly mountable stylus represents a separate beam-defining optical component.

Figure 3A:
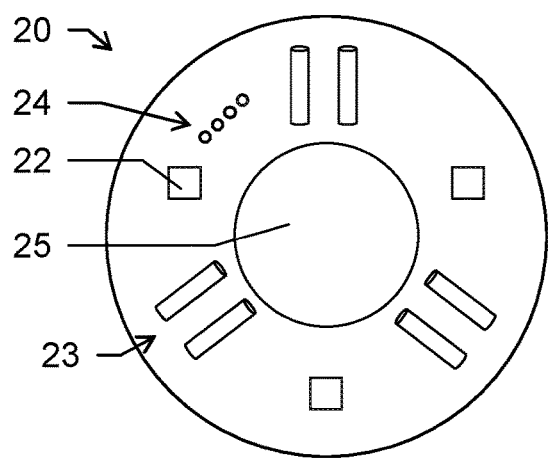
FIGS. 3a-b show embodiments of the receiving and attaching parts of a micro-optical interface according to the invention.

FIG. 3a shows an embodiment of the receiving part of the micro-optical interface 20 (e.g. provided by a probe as shown in FIG. 2) in more detail in top view. The interface comprises three magnetic components 22 (e.g. permanent- or electro-magnets) which in interaction with respective magnetic counterparts provide a holding force, in particular for a beam-defining optical component.

Furthermore, three cylinder pairs 23 of a three-ball bearing are provided by the micro-optical interface 20 which are structurally designed to receive respective balls of the three-ball bearing on side of such beam-defining optical component to be connected.

The magnetic components 22 and the cylinder pairs 23 build a mechanical coupling unit 21 as referenced in FIG. 2.

In the centre region 25 a fibre ferrule (in case shown receiving part is provided on side of a probe) or one or more other light manipulating optical elements (in case shown receiving part is provided on side of a beam-defining optical component) may be arranged.

In addition, the micro-optical interface 20 may, for example, comprise an electrical interface 24, e.g. having a number of electrical contacts, for enabling electrical supply of the beam-defining optical component and/or transmission of data, e.g. optical properties of the beam-defining optical component stored in a small EEPROM memory.

Figure 3B:
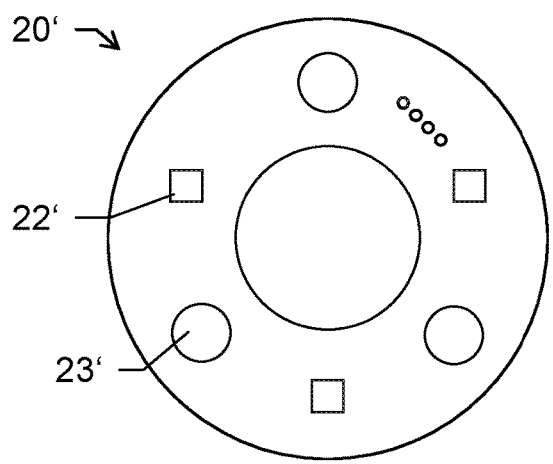

FIG. 3b shows an embodiment of a counterpart 20' to a receiving part of the micro-optical interface 20 of FIG. 3a. Such counterpart may preferably be provided with a beam-defining optical component as mentioned. Thus, the beam-defining optical component can modularly be attached to the probe 10 with low effort and in an easy way.

However, it is to be understood that the corresponding parts of the micro-optical interface 20 may be arranged in inverted manner, i.e. the counterpart 20' may embodied at the probe 10 and the receiving part may be designed on side of the beam-defining optical component. Using such inverted design mechanical and optical coupling properties are provided in a suitable way as well.

The part 20' of the interface respectively comprises three balls 23' of a three-ball bearing and three magnetic elements 22'. Those components are preferably designed to precisely interact with counter-components of the interface 20.

Figure 4:
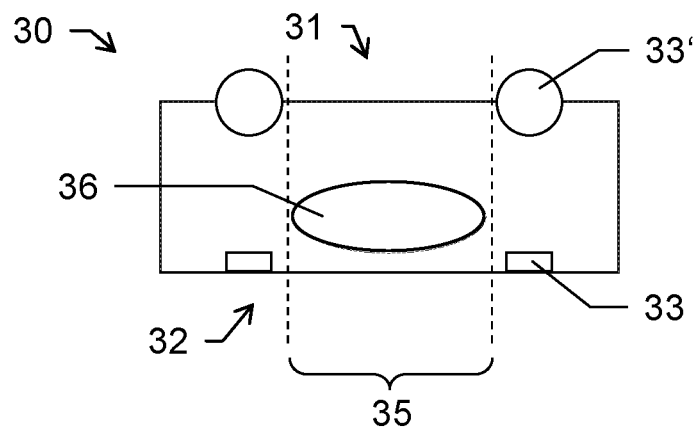
FIG. 4 shows an embodiment of a beam-defining optical component according to the invention.

FIG. 4 shows an embodiment of a beam-defining optical component 30 according to the invention (in side view) which comprises an attaching part 31 of a first micro-optical interface on top and a receiving part 32 of a second micro-optical interface at bottom (opposite side of the beam-defining optical component 30).

The beam-defining optical component 30 enables forming and defining measuring light, which is emitted at the end of the probe as original source light in more or less undefined manner, at which probe the beam-defining optical component 30 is intended and designed to be connected to. For that, a light manipulating optical element 36, e.g. a lens, is arranged in the centre region 35 of the beam-defining optical component 30.

The attaching part 31 is designed to interact with a counterpart at the end of a stylus or probe body of a measuring probe for a CMM. Such attaching part 31 comprises a number of balls 33' of a respective ball bearing relatively positioned so that the balls 33' can interact with receiving parts of a ball bearing at the stylus or probe body. Moreover, the attaching part 31 comprises some connecting elements like magnets or clamps or the like (not shown) for enabling modular connection to the stylus by providing releasable holding forces.

The receiving part 32 is designed as a negative counterpart to the attaching part 31, i.e. the receiving elements 33 are designed to interact with balls of a ball bearing and there are some connection elements (not shown) providing a holding force on interaction with respective counter-connection elements.

Such design provides a modular arrangement of several beam-defining optical components of corresponding type in modular manner, e.g. stack-like. Such optical components may comprise different optical elements each of which defining the measuring light to be emitted in a particular manner. For instance, a first beam-defining optical component 30 comprises an arrangement of lenses to provide collimation of divergent light emitted at the end of the stylus and a second beam-defining optical component—which is attached to the bottom side of the first beam-defining optical component 30—comprises a moveable mirror (e.g. provided by MEMS) to variable define the emitting direction and/or angle of the measuring light. Said lenses and mirror represent particular light manipulating optical elements, wherein other element types like an optical fibre or a filter etc. may be arranged instead or additionally.

Of course, more such optical components may be arranged in one line in order to generate recommended measuring light, e.g. a focussing unit may be placed between the first collimation unit and the second light deflection unit, the focussing unit also comprising an attaching part 31 of a first micro-optical interface and a receiving part 32 of a second micro-optical interface as shown with the beam-defining optical component 30.

The attaching part 31 may be built according to the counterpart 20' of FIG. 3b and/or the receiving part may be built according to the receiving part of the micro-optical interface 20 of FIG. 3a.

Alternatively, the attaching and/or receiving part can be of different design concerning structural embodiment (e.g. other type of bearing, other type of holding units (instead of magnets or clamps)), number or positions of mechanical connection elements. Additionally or alternatively, the design of the optical element 36 can differ with respect to its location (e.g. not in the centre region or on top or bottom of the beam-defining optical component 30) its design (e.g. extension, optical properties). For example, the optical element 36 may not be designed as a collimating unit but be designed as a focussing unit for providing a focussed laser beam.

Figure 5:
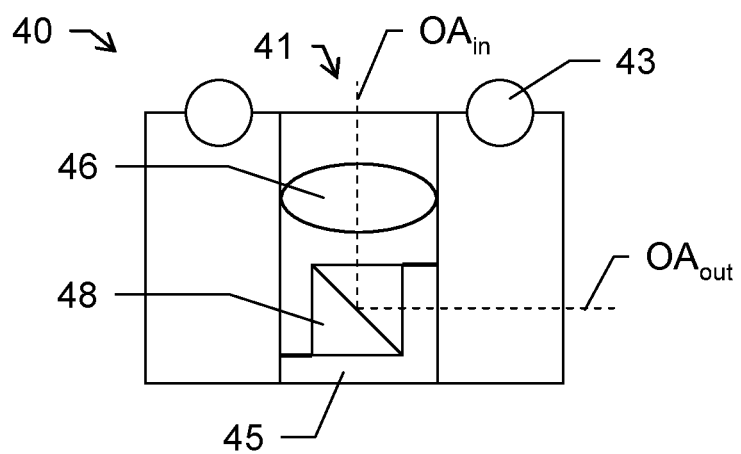
FIG. 5 shows a further embodiment of a beam-defining optical unit for being attached to the end of a measuring probe body.

FIG. 5 shows a further embodiment of a beam-defining optical unit 40 for being attached to the end of a measuring probe body of the type as shown, for example, with FIG. 2, in particular at the end of a respective stylus. The unit 40 at least comprises kind of bearing parts 43, here again embodied as balls of a ball bearing, arranged at a upper end 41 of the beam-defining optical unit 40 which is to be connected to the probe.

The optical unit 40 further is built with a hollow cylindrical area 45 in its centre region which extends through the whole unit 40. A lens 46 and a prism 48 (light manipulating elements) are arranged within that cylindrical recess 45.

Thus, in a connected state, i.e. when the optical unit 40 is connected with a respective probe body, and in operation of such probe assembly, light emitted at the probe body or stylus enters the cylindrical recess 45 of the optical unit 40 at the upper end 41 and is transmitted and influenced (formed) through and by the lens 46. The lens 46 is designed as a collimating lens and thus provides emission of collimated measuring light after the light emitted by the probe has passed the lens body.

After the measuring light has passed the lens 46, the light interacts with the prism 48 and consequently is deflected with an angle of 90° and emitted along a light emitting axis $OA_{out}$ which is orthogonal to a light entering axis $OA_{in}$ of the optical unit 40. In particular, the light entering axis $OA_{in}$ is parallel to the wall of the recess 41 and/or corresponds to the optical axis of the lens 46.

As a result of connecting the optical unit 40 with a suitable probe body measuring light is formed and emitted in a 90° angel relative to an extension axis of the probe body (with stylus) and is provided in collimated manner for measuring purpose. Such arrangement may be used for measuring a borehole.

According to an alternative embodiment, the prism 48 may be designed in semi transparent manner which provides emission of the measuring light in two directions simultaneously, i.e. in directions of the axis $OA_{out}$ and of the axis $OA_{in}$.

Figure 6:
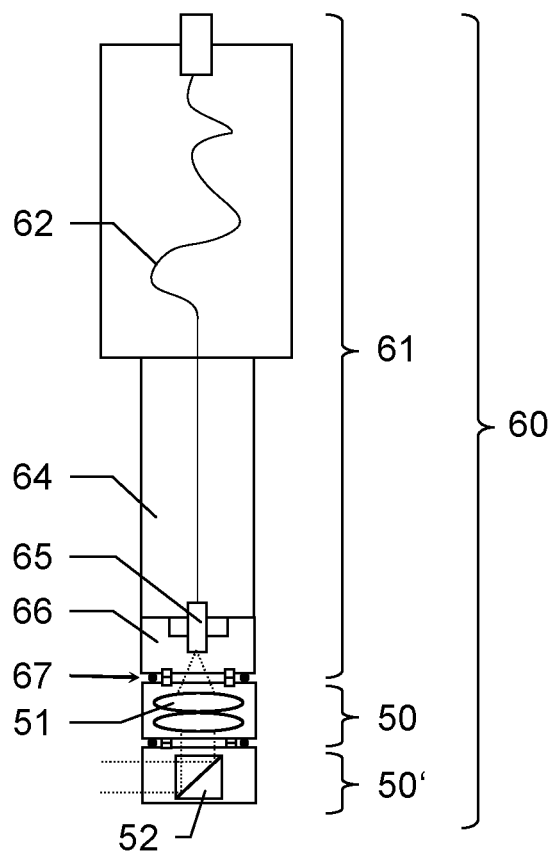
FIG. 6 shows an embodiment of an optical probe assembly according to the invention.

FIG. 6 shows an embodiment of an optical probe assembly 60 according to the invention. The assembly comprises a probe body 61 and two beam-defining optical components 50 and 50' attached to the probe body 61.

The probe body 61 comprises a stylus 64, preferably embodied as a carbon tube. An optical fibre 62 provides transportation of light through the probe body 61 and comprises a ferrule 65 at its end. The ferrule 65 is arranged with a micro-optics interface 66 which in addition to the ferrule 65 also comprises mechanics 67 for coupling of beam-defining optical components 50,50'. Such mechanics 67 in particular comprise parts of a bearing assembly preferably for three-point support, e.g. of a ball or shell-type bearing, and/or holding mechanisms (e.g. magnets, clamps, studs, receiving means etc.) for providing a respective holding force. Alternatively, the probe body 61 may be built without stylus 64 wherein mechanics 67 can directly be arranged at the probe body 61.

The holding mechanism may be designed to be manually or automatically controllable, i.e. the holding force can be applied and released upon a respective controlling signal, e.g. a magnetic force is switchable with a electro-magnetic element or mechanics of a receiving unit for a stud can be controlled so that a respective stud is either hold (clamped) or not. Alternatively, the holding mechanisms may be formed as a part of a bayonet coupling or joint, e.g. as a bayonet socket or its counterpart. Thus, the holding force can be established by connecting the components performing first an axial and second a rotational movement with a respective optical components 50,50' or the probe body 61.

Such controllable and switchable components may also be provided at the beam-defining optical components 50,50', wherein an electrical interface may be provided for supplying respectively controlled electricity to the optical components 50,50'.

Such assembly 60 provides the advantage of easy and fast attachment, release and/or exchange of a respective beam-defining optical component 50 or 50'. As the optical components 50,50' are of comparatively (compared to an entire measuring probe as known) small size and weight, substantially less stress is applied to their connection mechanics which leads to longer lifetimes and easier handling of the components. Moreover, (repairing- or replacing-) costs in case of damage of an optical component are significant lower compared to costs of an entire probe.

As described, the assembly 60 is modularly designed in such a way that different modular beam-defining optical components 50,50' can be available, e.g. situated in a storage or exchanging unit on or next to the coordinate measuring machine. By that, an easy and automated exchange of respective modules 50,50' depending on required measuring conditions can be provided.

Each beam-defining optical component 50,50' individually influences the properties and/or emitting direction of the (undefined) delivered source or measuring light in defined manner. Such influencing factors thus can be combined according to measurements to be performed by combining respective components 50,50', i.e. by arranging a first such component 50 at the probe 60 (stylus 64 of the probe 60), a second component 50' at the first one 50 and so on.

Of course, it is to be understood that one single optical component may solely be arranged at the probe body 61 and optimal measuring conditions are provided by that one component. Such one component may comprise a number of optical elements like at least one lens, an optical filter and a mirror.

Alternatively, as shown here with FIG. 6, the first beam-defining optical component 50 comprises an (light manipulating) optical element 51 for shaping light which is emitted at the ferrule 65. The optical element 51 may be built as or may comprise an arrangement of lenses or other optical components (e.g. optical filter, aperture etc.). By interaction of the emitted light with the optical element 51 the light may be collimated, focussed, filtered, polarised or the like for generating suitable light properties for specific measurement requirements.

The second beam-defining optical component 50' comprises a beam deflection unit 52, e.g. a prism or mirror, for changing the emission direction of the measuring light emitted by the first optical component 50 by a defined angle. The beam deflection unit 52 represents a further light manipulating optical element. The second optical component 50' may further comprise a mechanical system for changing orientation of the deflection unit 52 on demand. Thus, an angel of deflection and/or a relative radial emitting direction can be varied. The mechanical system may comprise MEMS and/or a piezo element.

An alternative embodiment whereby the optical components 50,50' and the opto-mechanical interface 66 at the stylus 64 are designed so that there is no spatial gap between the respective elements lies within the scope of the present invention.

According to an embodiment of such probe assembly 60 of the invention, the measuring light is both emitted by the ferrule and shaped by the attached optical components and after reflection at an object to be measured received through the optical components, directed to the ferrule and transported at least partly with the fibre to a detection unit.

Figure 7:
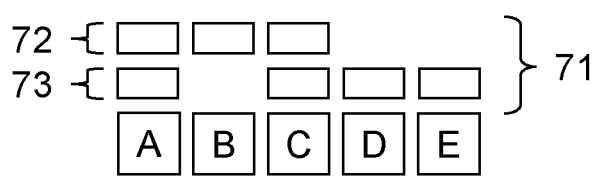
FIG. 7 shows a general concept of an optical tool changer according to the invention.

FIG. 7 schematically shows a concept of an optical tool changer 70 according to the invention. The tool changer 70 provides a number and variety of different optical components 71 which are arranged and placed at different changer positions A,B,C,D,E.

As shown, on a first level of the tool changer 70 a first set 72 of optical components is provided which may represent measuring optics having particular types of lenses (collimation, focussing etc.) and in particular respective spacers for providing a defined distance between a ferrule of the probe and the respective lens. Such first set of optical components for example represents optical elements basically corresponding to optics of known probe types. For instance, such elements may be represented by a spacer and a GRIN lens or by free beam optics and a lens.

A second set 73 of optical components is provided on a second level. The second set 73 may provide light deflecting components for enabling a change of a light emitting direction of the probe assembly. Such a deflecting component may preferably comprise a prism or mirror which provides a deflection angle of e.g. 90°, 45°, 30° or 22.5°.

Of course, it is to be understood in context of the present invention that shown and described sets 72,73 of optical components may be arranged in alternative ways, i.e. not limited to a two-level-arrangement as shown but e.g. in one plane.

Thus, the tool changer 70 can hold different configurations of optical component and/or stylus, e.g.

any optics can sit independently on the tool changer 70, any prism (90°, 45°, 30° etc.) can sit independently on the tool changer 70, any combination of optics and prism can sit on the tool changer 70, any straight stylus extensions (10 cm, 20 cm etc.) can be arranged on the tool changer 70, any cranked stylus shapes can be arranged on the tool changer 70 and/or any combination of above components can sit on the tool changer 70.

A lens and prism selection process can be done automated by a basic probe body being connected to a CMM that drives to the micro-optical tool changer 70 for attaching the desired modular elements. This micro-optical tool-changer 70 can take much less space than a regular tool-changer for (entire) probes. When the probe body or basis is driven to be located directly above an optical component or stylus to be attached a connection mechanism (e.g. electro-magnetic elements or holding-clamps) can (automatically) be activated for generating respective holding force and providing connection of the optical component to the probe basis. Due to respectively high-precise bearing elements optical properties of measuring light can be defined with respective high accuracy.

As parts 71 in the tool changer 70 are of comparatively light weight, one possibility would be to grab the part magnetically with permanent magnets or with electrically switchable magnets (e.g. coils). Other principles based on actuators (e.g. piezo drives) or kinematic systems (like the kinematic joint of TESA) are also possible mechanical couplings.

By connecting one component after the other, a desired arrangement of several components can be provided and a specifically demanded manner of emitting measuring light can be realised.

In particular, the micro-optical modules 71 are free beam optics and there is no degradation process for the optical parts during an exchange process. For a precise alignment of the modules a three ball-bearing can be integrated with spheres on one side and cylinder pairs on the counterpart.

Although the invention is illustrated above, partly with reference to some specific embodiments, it must be understood that numerous modifications and combinations of different features of the embodiments can be made and that the different features can be combined with each other or with coordinate measuring machines known from prior art.

The invention claimed is:

1. An exchangeable probe body of an optical probe assembly, the probe assembly being designed for optically measuring a distance to an object while being carried by a probe head of a coordinate measuring machine, the probe body comprising:
   a detachable coupling unit at a first end of the probe body designed for providing exchangeable coupling of the probe body to the probe head of the coordinate measuring machine;
   a light guiding element for transmitting original source light supplied by the probe head from the detachable coupling unit to a second end of the probe body;
   a measurement probe stylus having a stylus tip on a free end of a stylus shaft, wherein the stylus tip at the free end of the measurement probe stylus is the second end of the probe body;
   an optics probe-interface on the second end of the probe body at the stylus tip, the optics probe-interface comprising:
      a source light emitting element providing emission of the original source light in a defined direction from the second end at the stylus tip and with basically an emitting divergence defined by the light guiding element and/or defined by the source light emitting element; and
      a mechanical probe-coupling at the stylus tip comprising a bearing that is designed to receive a coupling counterpart being provided by a mechanical component-coupling of a beam-defining optical component of the optical probe assembly,
   wherein:
      the original source light is providable by the probe body with the emitting divergence, and
      desired measuring light with desired measuring light properties for measurement is providable by coupling of the beam-defining optical component to the second end at the stylus tip.

2. The exchangeable probe body according to claim 1, wherein the light guiding element is embodied as an optical fiber or free-beam optics.

3. The exchangeable probe body according to claim 1, wherein the light guiding element comprises a lens.

4. The exchangeable probe body according to claim 1, wherein the light guiding element comprises a collimation lens.

5. The exchangeable probe body according to claim 1, wherein:
   the source light emitting element is embodied as a ferrule, wherein the ferrule provides emission of the original source light with a divergence corresponding to the divergence of the optical fiber.

6. The exchangeable probe body according to claim 1, wherein:
   the mechanical probe-coupling having the bearing comprises at least one sphere of a ball-bearing or at least one sphere-counterpart of a ball-bearing.

7. The exchangeable probe body according to claim 1, wherein:
   the mechanical probe-coupling comprises at least one magnetic element for generating a holding force for connecting the beam-defining optical component.

8. The exchangeable probe body according to claim 1, wherein:
   the mechanical probe-coupling comprises at least one switchable electro-magnetic element for generating a holding force for connecting the beam-defining optical component.

9. A beam-defining optical component of an optical probe assembly, the probe assembly being designed for measuring a distance to an object while being carried by a probe head of a coordinate measuring machine and comprising the exchangeable probe body according to claim 1, the optical component comprising:
   an optics component-interface having mechanical component-coupling designed to couple the optical component to a counterpart provided by a mechanical probe-coupling at a second end of a probe body of the optical probe assembly; and
   a light manipulating optical element designed to provide desired measuring light with desired measuring light properties based on manipulation of original source light provided by the probe body.

10. The beam-defining optical component according to claim 9, wherein:
    the light manipulating optical element is configured as one or as a combination of the following optical elements:
       at least one lens,
       a prism,
       a mirror,
       a light guiding element, and
       an actuator, wherein the actuator comprises a reflecting member.

11. The beam-defining optical component according to claim 9, wherein:
    the optical component is designed as an extension for the measurement probe stylus of the probe body.

12. The beam-defining optical component according to claim 9, wherein:
    the optical component comprises a data memory unit and a data interface providing information about optical properties of the optical component, wherein the data memory is built as an EEPROM memory and/or the data interface comprises electronic contact means or wireless communication means.

13. The beam-defining optical component according to claim 12, wherein the data memory unit and a data interface provide information about properties of the light manipulating optical element or a probe-type.

14. The beam-defining optical component according to claim 13, wherein:
    the mechanical component-coupling comprises at least one magnetic element that generates a holding force for connecting the beam-defining optical component and/or at least one sphere of a ball-bearing or at least one sphere-counterpart of a ball-bearing.

15. The beam-defining optical component according to claim 14, wherein the magnetic element compresses a switchable electromagnetic element.

16. The beam-defining optical component according to claim 14, wherein the ball-bearing comprises three spheres.

17. The beam-defining optical component according to claim 14, wherein:

the optical component comprises a further optics component-interface arranged at an opposite end of the optical component relative to the component-interface for coupling the optical component to the probe body, the further optics component-interface is designed for receiving a coupling counterpart being provided by a further beam-defining optical component for the optical probe assembly.

18. An optical probe assembly for a coordinate measuring machine embodied as a system of the exchangeable probe body according to claim 1, the optical probe assembly being designed to be carried by a probe head of the coordinate measuring machine and to receive and emit measuring light, wherein:

the beam-defining optical component is coupled to the probe body by means of the optics interfaces, by means of the mechanical couplings, and the original source light is transmittable and adjustable by means of the optical probe assembly so that desired measuring light is emittable with desired measuring light properties.

19. The optical probe assembly according to claim 18, wherein:

the optical probe assembly comprises an electrical connection for data transmission from the beam-defining optical component through the probe body to the probe head, wherein information about an attached probe configuration according to a type of beam-defining optical component and a type of probe body is transmittable to the coordinate measuring machine.

20. The beam-defining optical component according to claim 9, wherein the light guiding element is embodied as an optical fiber or free-beam optics.

21. The exchangeable probe body according to claim 1, wherein:

the optics probe-interface is on a free end surface of the measurement probe stylus, wherein the free end surface of the measurement probe stylus is opposite of the first end of the probe body; and the mechanical probe-coupling having the bearing includes at least one sphere of a ball-bearing or at least one sphere-counterpart of a ball-bearing.

* * * * *